United States Patent
Kamperman et al.

(10) Patent No.: US 6,951,029 B2
(45) Date of Patent: *Sep. 27, 2005

(54) SECURITY DEVICE MANAGED ACCESS TO INFORMATION

(75) Inventors: Franciscus L. A. J. Kamperman, Eindhoven (NL); Frank Bosveld, Eindhoven (NL)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 556 days.

(21) Appl. No.: 08/851,304

(22) Filed: May 5, 1997

(65) Prior Publication Data

US 2001/0005901 A1 Jun. 28, 2001

(30) Foreign Application Priority Data

May 6, 1996 (EP) .............................................. 96201239

(51) Int. Cl.[7] .................................................. H04N 7/16
(52) U.S. Cl. .............................. 725/25; 725/6; 725/30; 725/31; 380/43; 380/231; 380/232
(58) Field of Search ........................ 348/5.5, 3; 380/10, 380/21, 23, 43, 231–234; 340/825.33, 825.34; 725/6, 31, 25, 27, 28, 30; 713/185, 172, 173, 159

(56) References Cited

U.S. PATENT DOCUMENTS 5,235,415 A * 8/1993 Bonicel et al. ............... 358/84
5,461,675 A * 10/1995 Diehl et al. .................... 380/23
5,537,473 A * 7/1996 Saward .......................... 380/16
5,594,493 A * 1/1997 Nemirofsky .................. 348/13
5,737,026 A * 4/1998 Lu et al. ...................... 348/473
5,748,732 A * 5/1998 Le Berre et al. .............. 380/10
5,852,290 A * 12/1998 Chaney ....................... 235/492
5,880,769 A * 3/1999 Nemirofsky et al. .......... 348/12

FOREIGN PATENT DOCUMENTS

| EP | 0605115 A2 | 7/1994 |
| EP | 0633694 A1 | 1/1995 |
| EP | 0679028 A2 | 10/1995 |
| EP | 0679028 A2 * | 10/1995 |

* cited by examiner

*Primary Examiner*—Ngoc Vu

(57) ABSTRACT

In an information delivery system, a security device (SD) manages an access to information (INF). The security device (SD) is capable of providing a pointer (PO) which indicates a location (LO) from which additional data (ADA) may be obtained. The additional data (ADA) may be a description of the information (INF) which is offered. For example, in a pay TV system, the information (INF) may be a particular movie of which the description is "James Bond, Dr. No, action category, 12 year and older, broadcast April 19, at 20H30." In that case, the pointer (PO) may be used to inform a subscriber that his security device (SD) allows him to watch this particular movie. However, the additional data (ADA) contained in the location (LO) indicated by the pointer (PO), may also be software for various purposes such as, for example, playing games or configuring a receiver (REC) which co-operates with the security device (SD).

1 Claim, 2 Drawing Sheets

SECURITY DEVICE MANAGED ACCESS TO INFORMATION

BACKGROUND OF THE INVENTION

The invention relates to management of access to information by means of a security device. The information may be provided in a scrambled form. In that case, the security device may allow or may not allow descrambling depending on whether or not it contains data objects which represent an entitlement to access the information.

U.S. Pat. No. 5,235,415 describes an arrangement for allowing fee paying subscribers to access TV or radio programs. Data describing the program fees and the account status is contained in a subscriber held security processor such as a smart card. The arrangement includes a keyboard for requesting messages concerning the programs. As a function of the content of the requests, a module converts the data contained in the security processor into intelligible messages by using transcoding tables transmitted regularly within the television and/or radio signals.

SUMMARY OF THE INVENTION

The invention seeks, inter alia, to provide management of access to information by means of a security device which, with respect to the background art, allows greater flexibility. Additional features, which may be optionally used to implement the invention to advantage, are defined in the dependent claims.

The invention takes the following aspects into consideration. An information provider may want to provide his subscribers with a new type of security device at a certain point in time. In practice, it will not be feasible to make all subscribers change their old security device for the new one at the exactly same moment. Thus, there will be a transitional period in which the both the old security device and the new security device may be used.

In the background art, certain practical problems will arise if, in the new security device, a new code and/or format is used for the data which is contained therein. For example, the information provider will have to transmit two different types of transcoding tables, namely one transcoding table for transcribing the data in the old code into intelligible messages, and an another transcoding table for transcribing the data in the new code. Transmission of two different types of transcoding tables requires additional transmission capacity, which may be difficult to find or which may even not be present at all.

In accordance with the invention, there is provided, in a security device, a pointer indicating a location from which additional data may be obtained. The additional data may be a description of the information which is offered. For example, in a pay TV system, the information may be a particular movie of which the description is "James Bond, Dr. No, action category, 12 year and older, broadcast April 19, at 20H30." Such descriptions will be available in an intelligible form because information providers will want to inform the public on what they are offering to stimulate purchase. The pointer may be used to inform a subscriber that his security device allows him to watch this particular movie. Transcoding tables are not required for that purpose. Consequently, the inventions allows greater flexibility than the background art.

Other advantages of the invention are as follows. In contradistinction with the background art, the invention does not require a dedicated module for transcoding the data contained in the security device on the basis of transcoding tables. In the invention, any hardware and/or software for obtaining the additional information from the location indicated by the pointer, will be relatively simple in most cases. Moreover, such hardware and/or software may be wholly or partially used for other functions which involve data retrieval and/or data representation like, for example, an electronic program guide (EPG) function. Consequently, the invention also allows a relatively cost-effective implementation.

The additional data, which may be obtained from the location indicated by the pointer, may be any type of data. For example, it may be software which may have or may not have a certain relationship with the information to which the access is controlled by means of the security device. The additional data may also be software for providing an interface between the security device and a device to which it may be coupled. Thus, the invention also allows to complement the functionality of the security device itself, as well as to enhance the functionality of an arrangement of which the security device may form part.

The invention and additional features, which may be optionally used to implement the invention to advantage, are be apparent from and will be elucidated with reference to the drawings described hereinafter.

DETAILED DESCRIPTION OF THE PREFERRED EMBODIMENTS

First, some remarks will be made on the use of reference signs. Similar entities are denoted with an identical lettercode throughout the drawings. In a single drawing, various similar entities may be shown. In that case, a numeral is added to the lettercode, to distinguish similar entities from each other. The numeral will be between parentheses if the number of similar entities is a running parameter. In the description and the claims, any numeral in a reference sign may be omitted if this is appropriate.

Figure 1:
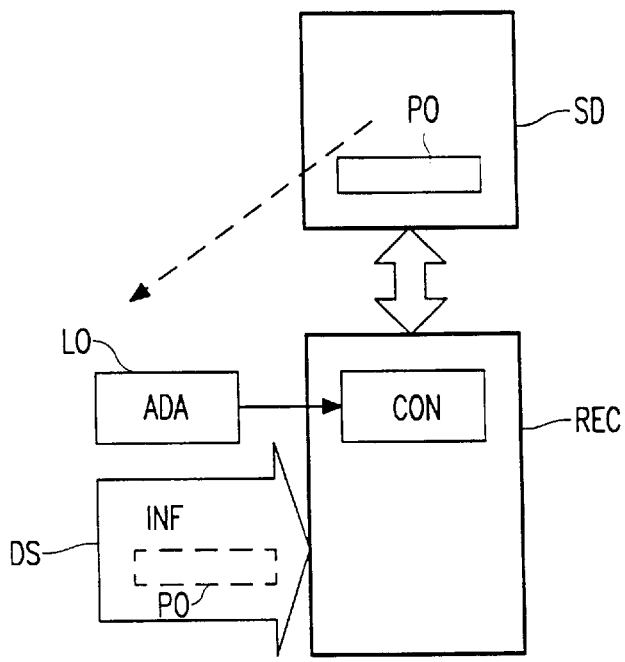
FIG. 1 is a conceptual diagram illustrating basic features of the invention.

FIG. 1 illustrates basic features of the invention in some its various aspects, namely with regard to a security device SD, a receiver REC and a data stream DS. The security device SD manages an access to information INF. It is capable of providing a pointer PO indicating a location LO from which additional data ADA may be obtained. The receiver REC co-operates with the security device SD. It includes a circuit CON for retrieving the additional data ADA from the location LO by the pointer PO. The location LO is preferably outside the secure device SD. The information INF may be supplied to the receiver REC in the form of a data stream DS. In that case, the pointer PO may have been transmitted to the security device SD for storage therein via the data stream DS.

In principle, the additional data ADA may be any kind of data. Three different types of additional data will be given by way of example.

First, the additional data ADA may be a description of the information INF which is offered. For example, in a pay TV system, the information INF may comprise a particular movie of which the description is "James Bond, Dr. No, action category, 12 year and older, broadcast April 19, at 20H30." The pointer PO may be used to inform the subscriber that his security device SD contains a data object which allows him to watch this movie. To this end, the pointer PO may be associated with this data object or it may even form a part of it, which will be discussed in greater detail hereinafter.

Secondly, the additional data ADA may be software for providing an interface between the security device SD and the receiver REC which need to co-operate. For example, the receiver REC may be a universal settop box which is capable of co-operating with different types of security devices belonging to, for example, different pay TV system operators. To this end, the settop box may be provided with a universal interface which needs to be configured to provide a communication link between the universal settop box and a particular security device. In that case, the pointer PO may indicate a location which contains software for configuring the universal interface such that the security device and the settop box may co-operate in a desired fashion.

Thirdly, the additional data ADA may be software for enhancing the functionality at the subscriber's end. Such software may have a certain relationship with the information INF to which the access is controlled by the security device SD. For example, the additional data ADA may be software for playing a game which may relate to a certain program or event in a pay TV system.

Figure 2:
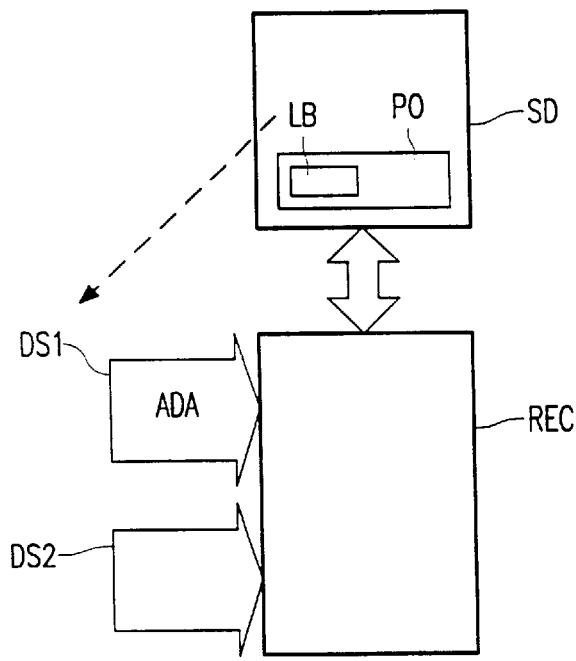
FIGS. 2 to 4 are conceptual diagrams illustrating additional features which may optionally be used to implement the invention to advantage.

FIG. 2 illustrates the following additional feature. The pointer PO comprises at least one element LB which identifies a data stream DS1 of which the additional data ADA forms part. The FIG. 2 feature takes the following aspects into consideration. At a certain moment, a subscriber may want to obtain additional data ADA associated to a certain data object contained in his security device SD. At that moment, his receiver REC may very well be tuned to a data stream DS2 which is not the one of which the desired additional data ADA forms part. The FIG. 2 feature allows the receiver REC to automatically tune to the data stream DS1 which contains the desired additional data ADA in order to subsequently retrieve the desired additional ADA data from the data stream DS1. Thus, the FIG. 2 feature contributes to user-friendliness.

Figure 3:
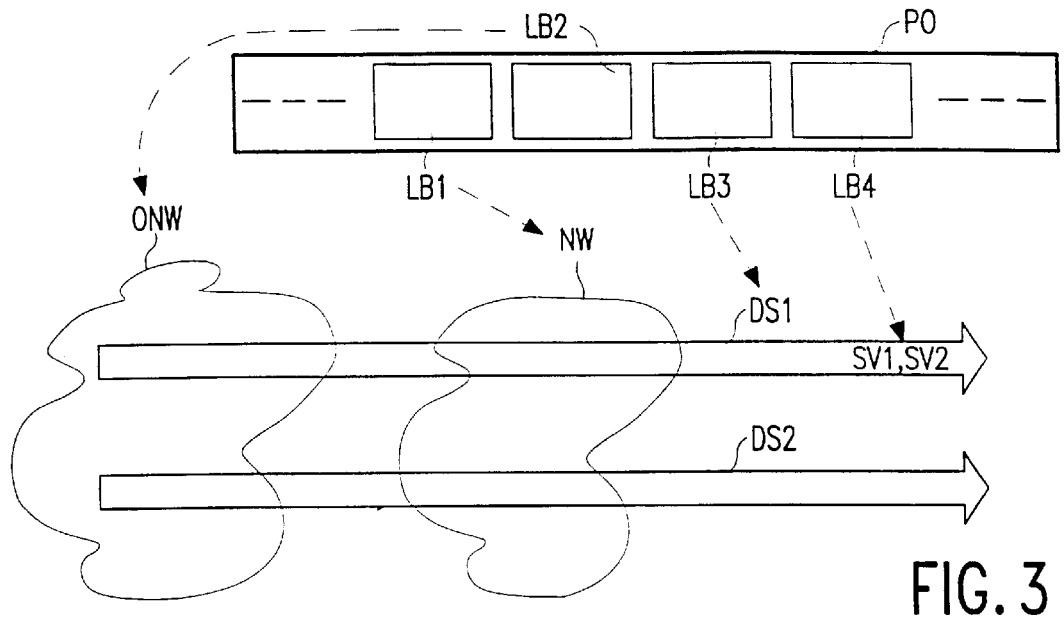

FIG. 3 illustrates the following additional feature. The pointer PO comprises the following elements:

a label LB1 for identifying an information delivery system or network NO;

a label LB2 for identifying an original information delivery system or original network ONW;

a label LB3 for identifying a data stream DS1 from any other data stream DS2 provided by the information delivery system; and a label LB4 for identifying a service SV1 from any other service SV2 within the data stream. A service is a collection of various pieces of information offered by an information provider. For example, in a pay TV system, a collection of sports programs may be a service. The FIG. 3 feature allows to create a backward link from a data object in the security device concerning an entitlement, to service information in a data stream of the MPEG type, MPEG being an abbreviation for Moving Pictures Expert Group.

Figure 4:
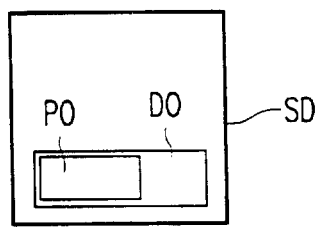

FIG. 4 illustrates the following additional feature. The pointer PO forms part of a data object DO contained in the security device SD. This allows efficient use of available data storage capacity in the security device SD and an easy access to the pointer PO. Nevertheless, the FIG. 4 feature may seem strange because, on the one hand, the pointer PO is uncoded and public whereas, on the other hand, the security of data objects is essential to the inviolability of the access management. However, it is taken into consideration that data objects need not be coded in their entirety in order for the access management to be inviolable. What matters is that no one other than the relevant information provider is able to store data objects in the security device. To this end, a secret check code may be added to the pointer PO so as to form the data object. The check code may be generated on the basis of the pointer PO itself in combination with a secret key which is in the possession of the service provider and which is also stored in the security device. If a data object is supplied to the security device SD, it checks if the secret code which is added to the pointer is correct. If so, it will store the data object, if not it will reject the data object.

Figure 5:
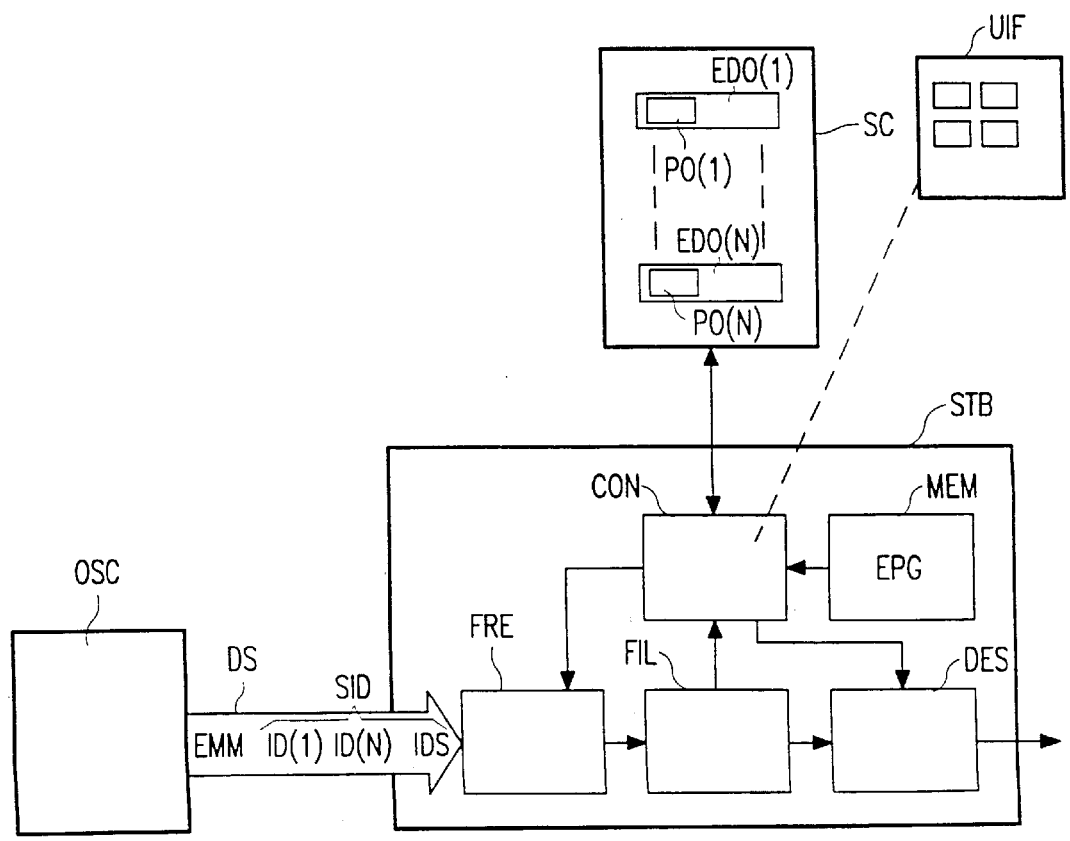
FIG. 5 is a block diagram of an example of a pay TV system in accordance to the invention.

FIG. 5 illustrates an example of an pay TV system in accordance with the invention. It comprises the following main elements: an operator service centre OSC and, at a subscriber's end, a settop box STB, a user interface UIF, and a security device in the form of a smart card SC. The settop box STB includes a front-end FRE, a data filter FIL, a descrambler DES, a controller CON, and a memory MEM which includes EPG software. The settop box STB may be coupled to a picture display device, not shown in FIG. 5.

The FIG. 5 system operates as follows. The operator service centre OSC transmits, in a scrambled form, television programs to the settop box STB by means of an MPEG data stream DS. The MPEG data stream DS includes entitlement messages EMM concerning entitlements of a subscriber, or a group of subscribers, to watch certain programs. The MPEG data stream DS also includes service information data SID, for example, as specified in the European Telecommunication Standard 300 468. The service information data SID comprises, amongst other things, descriptions of the following: the program provider, the programs, and the scheduling/timing of these programs. The description of different programs are distinguished by unique identifiers ID(1) . . . ID(N). Furthermore, the service information data SID also contains identifiers IDS to uniquely identify the MPEG data stream DS and its origin.

At the subscriber's end, the front-end FRE is tuned to the MPEG data stream DS. The filter FIL extracts the service information data SID and the entitlement messages EMM from the MPEG data stream DS. The controller CON may process the service information data SID using the EPG software, so as to provide visual presentations which inform the subscriber on current and future programs. The controller CON may also transfer the entitlement messages EMM to the smart card SC. The entitlement messages EMM are processed in the smart card SC so as to obtain entitlement data objects EDO(1) . . . EDO(N) which, subsequently, are stored in the smart card SC. An entitlement data objects EDO may be regarded as controlling a switch which enables or disables the descrambler DES when a certain program is provided. Thus, access to programs depends on the entitlement data objects EDO contained in the smart card SC. To inform the subscriber whether or not he can watch a particular program, the entitlement data objects EDO(1) . . . EDO(N) also comprise pointers PO(1) . . . PO(N). These pointers may have been transmitted, for example, by means of the entitlement messages EMM.

The subscriber may obtain an overview of all programs he is entitled to watch, in the following manner. He may order such an overview via the user interface UIF. In response, the controller CON will examine the smart card SC by reading all pointers PO(1) . . . PO(N) contained therein. Next, the controller CON will check if the front-end FRE is tuned to the desired MPEG data stream DS on the basis of the identifiers IDS which uniquely identify data streams. If the front-end FRE were not tuned to the MPEG data stream DS, the controller CON would tune the front-end FRE in accordance with the pointers PO(1) . . . PO(N) which contain a data element indicating the desired MPEG data stream DS. Once the front-end FRE has been correctly tuned, the controller CON will connect the pointers PO(1) . . . PO(N) and the service information data SID by means of the identifiers ID(1) . . . ID(N) contained therein. Accordingly, it will read those portions of the service information data SID pertaining to the programs which the subscriber is entitled to watch. The EPG software is used to visualize those portions in the service information data SID such that the subscriber obtains the overview he has ordered.

The drawings and their description hereinbefore, illustrate rather than limit the invention. Evidently, there are numerous alternatives which fall within the scope of the appended claims. In that respect, the following closing remarks are made.

There are numerous ways of physically spreading functions or functional elements over various units. In this respect, the drawings are very diagrammatic and respectively represent only one possible embodiment of the invention. As an example, with reference to FIG. 1, the security device SD may form an integral part of the receiver REC.

Any type of information INF accessed by means of the secure device SD. For example, the information INF may be music or software. It may also be a combination of, for example, video, music and software.

Any manner may be used to make the information INF and the additional data ADA available to a user. For example, the information INF may be stored in a database which can be accessed via Internet or any other means. It may also be stored on a carrier, such as a CD-ROM for example, which the user may purchase or get for free. Of course, the aforementioned also applies with regard to the additional data ADA.

Any type of receiver REC may be used to co-operate with the security device SD. For example, the receiver REC may be a computer terminal connected to a network via which data can be transmitted such as, for example, a telephone network.

Any number of elements may constitute the pointer PO. For example, with reference to the FIG. 3 feature, the pointer PO may additionally include a further label LB5 which identifies a program from any other program within the service SV1.

Any reference signs between parentheses shall not be construed as limiting the claim concerned.

What is claimed is:

1. A security device (SD) for managing access to information (INF), the security device (SD) providing a pointer (PO) indicating a location (LO) from which additional data (ADA) may be obtained;

wherein the pointer (PO) comprises the following data elements:

a label (LB1) for identifying an information delivery system;

a label (LB2) for identifying another information delivery system or original network;

a label (LB3) for identifying a data stream (DS1) from another data stream (DS2) provided by the information delivery system; and a label (LB4) for identifying a service (SV1) from any other service (SV2) within the data stream.

* * * * *